United States Patent
Selander

(10) Patent No.: US 7,380,566 B2
(45) Date of Patent: Jun. 3, 2008

(54) DEWATERING SYSTEM AND METHOD FOR A SUBSURFACE VAULT

(76) Inventor: Jon Selander, 39 Oak Grove Rd., Salt Point, NY (US) 12578

( * ) Notice: Subject to any disclaimer, the term of this patent is extended or adjusted under 35 U.S.C. 154(b) by 489 days.

(21) Appl. No.: 11/142,632

(22) Filed: Jun. 1, 2005

(65) Prior Publication Data

US 2006/0207660 A1    Sep. 21, 2006

Related U.S. Application Data

(60) Provisional application No. 60/663,122, filed on Mar. 18, 2005.

(51) Int. Cl.
*D06F 39/08* (2006.01)
*F04B 49/00* (2006.01)
*F16L 5/00* (2006.01)

(52) U.S. Cl. .................... 137/312; 137/363; 417/41

(58) Field of Classification Search ............ 137/236.1, 137/312, 599.09, 599.11, 363; 417/41
See application file for complete search history.

(56) References Cited

U.S. PATENT DOCUMENTS

| | | | |
|---|---|---|---|
| 1,494,906 A * | 5/1924 | Haynes | 210/127 |
| 1,806,449 A * | 5/1931 | De Florez | 417/41 |
| 3,411,449 A * | 11/1968 | Murdoch | 417/41 |
| 3,782,860 A * | 1/1974 | DeLancey et al. | 417/41 |
| 4,140,153 A | 2/1979 | Deaton | |
| 4,161,219 A | 7/1979 | Pringle | |
| 4,172,698 A | 10/1979 | Hinz et al. | |
| 4,226,284 A | 10/1980 | Evans | |
| 4,252,197 A | 2/1981 | Pringle | |
| 4,376,464 A | 3/1983 | Crow | |
| 4,437,514 A | 3/1984 | Canalizo | |
| 4,552,512 A * | 11/1985 | Gallup et al. | 417/6 |
| 4,567,908 A * | 2/1986 | Bolsterli | 137/1 |
| 4,791,990 A | 12/1988 | Amani | |
| 4,901,798 A | 2/1990 | Amani | |
| 4,948,340 A * | 8/1990 | Solomon et al. | 417/41 |
| 4,990,061 A | 2/1991 | Fowler et al. | |
| 5,007,451 A * | 4/1991 | Bralich | 137/362 |
| 5,232,308 A * | 8/1993 | Verstraeten | 405/53 |
| 5,345,812 A * | 9/1994 | Haboian | 73/46 |
| 5,806,598 A | 9/1998 | Amani | |
| 6,006,773 A * | 12/1999 | Bravo | 137/15.08 |
| 6,050,050 A * | 4/2000 | Daul et al. | 52/741.12 |
| 6,206,645 B1 | 3/2001 | Pringle | |

(Continued)

*Primary Examiner*—John Rivell
*Assistant Examiner*—Cloud K Lee
(74) *Attorney, Agent, or Firm*—Carter, DeLuca, Farrell & Schmidt, LLP

(57) ABSTRACT

A system and method for dewatering a subsurface vault housing a portion of a pipeline is provided. The dewatering system includes a fluid inlet pipe adapted for fluidly communicating with the pipeline and redirecting fluid being transported by the pipeline to a fluid pump system. The fluid pump system includes a pump capable of being operated solely by the redirected fluid for removing fluids, such as water, from within the subsurface vault. A fluid outlet pipe in fluid communication with the fluid pump system returns fluid not used to operate the fluid pump system back to the pipeline for being transported downstream from the dewatering system. A liquid level sensor is used for generating and transmitting a signal to a valve when the water within the subsurface vault exceeds a predetermined level for permitting the redirected fluid to flow to the fluid pump system.

20 Claims, 2 Drawing Sheets

U.S. PATENT DOCUMENTS

| | | | |
|---|---|---|---|
| 6,513,542 B1 * | 2/2003 | Hsieh | 137/312 |
| 6,527,005 B2 * | 3/2003 | Weaver | 137/312 |
| 6,691,787 B2 | 2/2004 | Amani | |
| 6,968,872 B2 * | 11/2005 | Sakakura et al. | 141/311 A |
| 7,240,692 B2 * | 7/2007 | Parkkinen | 137/563 |

* cited by examiner

DEWATERING SYSTEM AND METHOD FOR A SUBSURFACE VAULT

PRIORITY

This application claims priority to a United States Provisional Application filed on Mar. 18, 2005 and assigned U.S. Provisional Application No. 60/663,122; the entire contents of which are incorporated herein by reference.

BACKGROUND

The present disclosure relates generally to subsurface vaults. In particular, the present disclosure relates to a dewatering system and method for a subsurface vault.

Subsurface maintenance vaults, of the type used as underground storage compartments, typically house a portion of a pipeline transporting fluids such as gas and water. Subsurface vaults are often infiltrated with fluids, particularly water, due to rain, snow, water runoff, etc. The water often becomes stagnant inside the vault, thus making it difficult to access the pipeline and typically requiring removal of the water from the vault, i.e. dewatering the subsurface vault, prior to entering the vault, often causing delay in accessing the vault. Moreover, if the water within the subsurface vault is not removed, over a prolonged period, the stagnant water can cause the pipeline and other metallic structures within the subsurface vault, such as staircases, pipeline valves, etc., to corrode, substantially reducing the life of the gas pipeline and other structures within the subsurface vault and/or increasing maintenance and replacement costs.

In the prior art, dewatering systems are disclosed for dewatering underground facilities, especially gas and oil wells. For example, U.S. Pat. No. 4,226,284 describes a dewatering method and system for dewatering a gas well on an intermittent, cyclical period which operates to eject water from the well without loss of gas from the well. The system includes a casing pressure bleed line having a shut off valve, and a first and second gas regulator. The casing bleed line connects to a timer which in turn is connected to a normally closed first motor valve and a normally open second motor valve. The dewatering system is operated when the first and second motor valves permit liquid and entranced gas to pass into a gas flow line and a liquid separator system.

U.S. Pat. No. 4,437,514 describes a method and apparatus for dewatering a gas well having a diverter valve for introducing liquid into a tubing of the gas well. The diverter valve is maintained closed when the liquid level drops below a selected level. A fluid responsive gas lift valve utilizes annulus gas to lift the liquid within the tubing from the well, and hence, dewater the well.

It is an aspect of the present disclosure to provide a dewatering system and method for a subsurface vault housing a portion of a pipeline where fluid being transported via the pipeline is used as a power source for the dewatering system.

SUMMARY

The present disclosure relates to a dewatering system and method for removing stagnant fluids, in particular water, from within a subsurface vault housing a portion of a pipeline. The dewatering system in accordance with the present disclosure is self-contained by using fluid being transported by the pipeline as the energy source for operating the system.

In particular, the dewatering system in accordance with the present disclosure includes a fluid inlet pipe adapted for fluidly communicating with a pipeline and redirecting fluid being transported by the pipeline. A fluid pump system in fluid communication with the fluid inlet pipe receives the redirected fluid to operate a pump of the fluid pump system for drawing or receiving stagnant water from within the subsurface vault via a water intake pipe and pumping the water to a predetermined dispensing location outside the subsurface vault via a water dispensing pipe. A fluid outlet pipe in fluid communication with the fluid pump system and the pipeline redirects or returns any fluid not used to power the pump and other components of the dewatering system back to the pipeline for being transported downstream from the dewatering system.

The dewatering system further includes a valve, preferably, a fluid-operated valve, to control fluid flow to the fluid pump system. The valve controls the fluid flow to the pump system by opening and closing in response to a signal indicating that stagnant water within the subsurface vault has exceeded a predetermined level. Once the fluid is received by the fluid pump system, the fluid pump system is activated. Accordingly, the fluid pump system is only activated when the stagnant water within the subsurface vault exceeds the predetermined level.

In order to determine when the stagnant water has exceeded the predetermined level, a liquid level sensor is used to sense when the stagnant water has exceeded the predetermined level. When the predetermined level is exceeded, the liquid level sensor generates and transmits a signal to the valve, and, in response, the valve is actuated to permit the redirected fluid to flow to the fluid pump system.

Once the fluid is received by the fluid pump system, the pump of the fluid pump system is activated using the fluid delivered by the fluid intake pipe as the energy source. The liquid level sensor transmits another signal to the valve after a predetermined time period which has been determined to be of sufficient duration to bring the water level within the subsurface vault to a desired level. Upon receiving this signal, the valve is deactivated to prevent fluid flow to the fluid pump system. Once fluid is not received by the pump of the fluid pump system, the pump is deactivated.

The dewatering system further includes a pressure reducing regulator for protecting the system from over pressurization due to the high pressure of the fluid being redirected from the pipeline to the valve and pump. The pressure reducing regulator, as known in the art, maintains the pressure of the fluid within the fluid inlet pipe below a threshold to prevent damage to the system components. The dewatering system further includes an orifice drip pipe for redirecting water within the water dispensing pipe, after the pump has been deactivated, to the water intake pipe for subsequent dispensing within the subsurface vault. This prevents water from remaining within the water dispensing pipe and water intake pipe and freezing during low temperatures.

BRIEF DESCRIPTION OF THE DRAWINGS

The foregoing and other features of the present disclosure will become more readily apparent and will be better understood by referring to the following detailed description taken in conjunction with the drawings wherein.

DETAILED DESCRIPTION OF PREFERRED EMBODIMENTS

Figure 1:
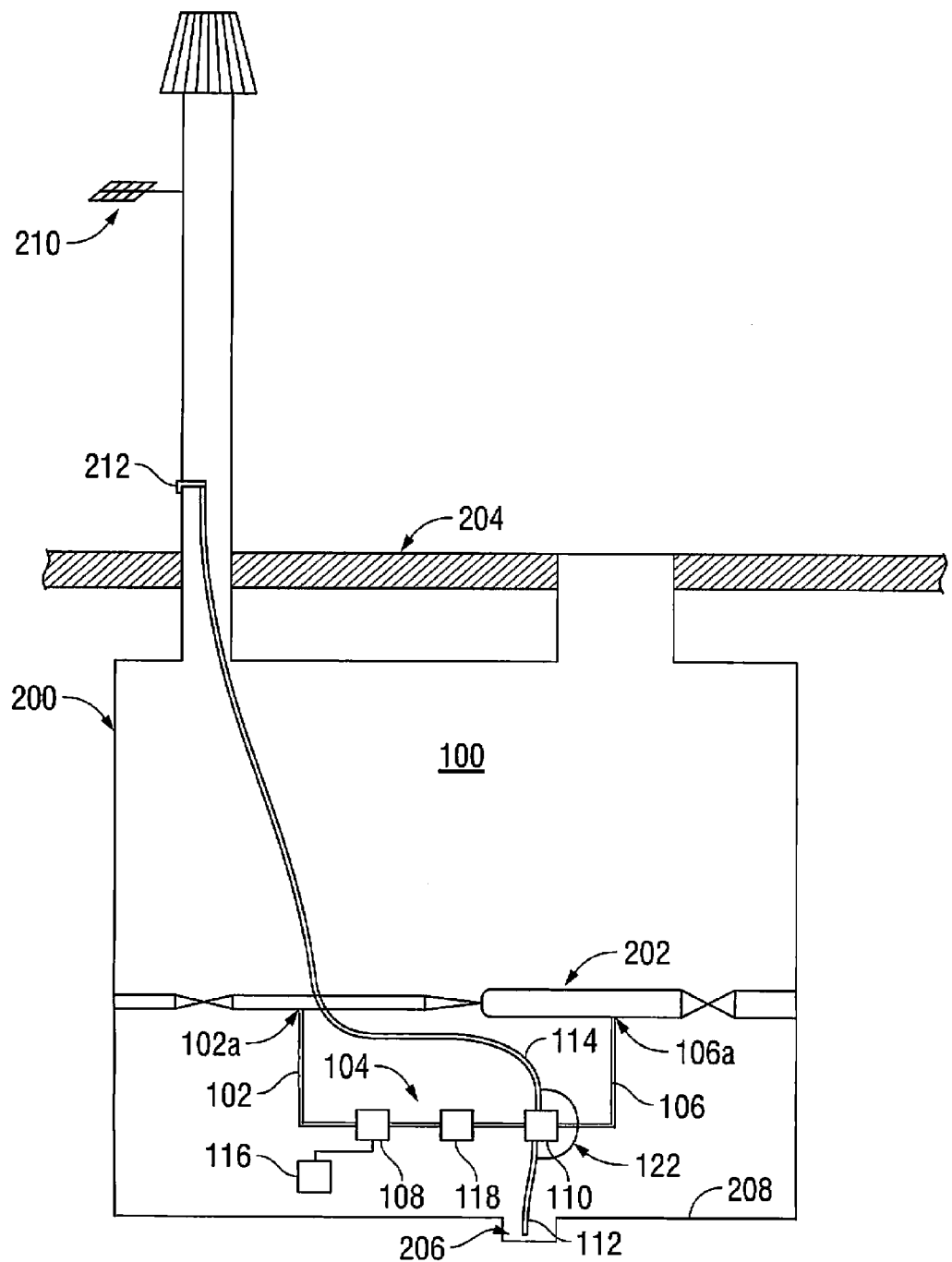
FIG. 1 is a partial cross sectional view of a dewatering system for a subsurface vault in accordance with the present disclosure.

Referring now in detail to the drawing figures, in which like references numerals identify similar or identical elements, a dewatering system and method for a subsurface vault in accordance with the teachings of the present disclosure will be disclosed.

With reference to FIG. 1, there is shown a dewatering system referenced generally by reference numeral 100. Dewatering system 100 is a self-contained system for dewatering a subsurface vault 200 housing a portion of a pipeline 202 transporting a fluid, such as, for example, natural gas, propane, methane, oil, gasoline, diesel fuel, etc. Subsurface vault 200 is an underground storage compartment located below a surface 204 for providing access to the pipeline 202 for maintenance and other purposes, such as the placement of remote metering devices for measuring the amount of fluid flow through the pipeline 2002.

The dewatering system 100 and method in accordance with the present disclosure remove water which has infiltrated an interior 208 of the subsurface vault 200 due to rain, snow, water runoff, etc. It is envisioned that dewatering system 100 and method can be used in other applications requiring the removal of fluids from subsurface vaults such as, for example, gas and oil wells. The dewatering system 100 and method can be used to remove liquids, other than water, such as, for example, oil, hydrates, motor fuel, slurries and the like, including fluids spilled from the pipeline 202 due to pipeline breakage and leaks.

Dewatering system 100 includes a fluid inlet pipe 102 in fluid communication with pipeline 202 via an inlet port 102a for receiving fluid from the pipeline 202. Fluid inlet pipe 102 is a high pressure pipe adapted for redirecting fluid being transported by the pipeline 202. A fluid pump system 104 is in fluid communication with fluid inlet pipe 102 for receiving fluid being transported by the pipeline 202. The fluid is used to actuate and operate the fluid pump system 104. During operation, the fluid pump system 104 draws or receives water from within subsurface vault 200 and pumps the water to a predetermined discharge or dispensing location.

The dewatering system 100 further includes a fluid outlet pipe 106 in fluid communication with the fluid pump system 104 and the pipeline 202. Fluid outlet pipe 106 is preferably a low-pressure pipe which is positioned downstream from fluid pump system 104 for receiving fluid not used to operate the fluid pump system 104 and other components of the system 100 and returning the fluid back to the pipeline 202 for being transported downstream from the dewatering system 100. Fluid outlet pipe 106 fluidly communicates with the pipeline 202 for returning fluid back to the pipeline 202 via outlet port 106a.

With continued reference to FIG. 1, dewatering system 100 includes a fluid-operated valve 108 operatively connected to the fluid inlet pipe 102 for controlling fluid flow to a fluid-operated pump 110 of the fluid pump system 104. Valve 108 is operated using fluid being transported by the fluid inlet pipe 102 for allowing and preventing, as known in the art, the redirected fluid to flow to the pump 110. The redirected fluid when it is received by the pump 110, is used by the pump 110 as an energy source for operating the pump 110. Hence, in accordance with the present disclosure, the valve 108 and the pump 110 are selected to be operational by the same fluid being transported by the pipeline 202.

The valve 108 can be selected from the group consisting of fluid-operated ball, gate, check, baumann, sliding stem and butterfly valves. The pump 110 can be selected from the group consisting of fluid-operated pneumatic, diaphragm, rotary, reciprocating and positive displacement pumps, as known in the art.

In a preferred embodiment of the present disclosure the pump 110 is a Yamada DP-10BAN pump. Other fluid-operated pumps capable of being incorporated within the dewatering system 100 of the present disclosure are disclosed by U.S. Pat. Nos. 4,172,698 and 6,691,787, the entire contents of which are incorporated herein by reference.

The valve 108 is actuated or activated in response to a signal received from a liquid level sensor 116 indicating that stagnant water within the subsurface vault 200 has exceeded a predetermined level. Liquid level sensor 116 generates and transmits an activation signal to valve 108 when the water level within subsurface vault 200 exceeds the predetermined level. Valve 108 is actuated in response to the signal transmitted by the liquid level sensor 116, thereby permitting the redirected fluid to flow from within the fluid inlet pipe 102 to the pump 110. Liquid level sensor 116 may include liquid level gauges available from Kenco Engineering.

After a predetermined time period which has been determined to be of sufficient duration for the water level within the subsurface vault 200 to reach a desired level, the liquid level sensor 116 generates and transmits a deactivation signal to the valve 108. In response to this signal, the valve 108 is deactivated and fluid within the fluid inlet pipe 102 is prevented from flowing to the fluid pump system 104 and the redirected fluid is no longer used to power the valve 108. The predetermined time period is clocked by a timer of the liquid level sensor 116 or by a separate timer in electrical communication with the liquid level sensor 116. Any fluid redirected from the pipeline 202 which is not used to power the valve 108 and the pump 100 is delivered back to the pipeline 202 via fluid outlet pipe 106 for being transported downstream from the dewatering system 100.

It is contemplated that other types of sensors can be used for activating and deactivating the valve 108, such as depth sensors. It is further contemplated to use two sensors where a first senor transmits a valve-activation signal when the water within subsurface vault 200 exceeds a first predetermined level and a second sensor transmits a valve-deactivation signal when the water within subsurface vault 200 reaches a second predetermined level. The first and second sensors are displaced vertically with respect to each other with the first sensor being located higher within the subsurface vault 200 than the second sensor.

To maintain the dewatering system 100 as a self-contained, self-powering system, the liquid level sensor 116 is preferably powered by a solar panel 210 positioned above surface 204. Alternatively, liquid level sensor 116 can be powered by a battery or other energy sources known in the art.

When operational, the pump 110 draws water from within the subsurface vault 200 via water intake pipe 112 and pumps the water through water dispensing pipe 114 to a predetermined location outside the subsurface vault 200. A first end of the water intake pipe 112 is operably connected to pump 110 and a second end of the water intake pipe 112 is positioned within sump 206 of the subsurface vault 200.

A pressure reducing regulator 118, as known in the art, is positioned at a location along the fluid inlet pipe 102 for protecting fluid pump system 104 from over pressurization due to the highly pressured fluid within the fluid inlet pipe 102. The pressure reducing regulator 118 maintains the pressure of the fluid within a predetermined threshold or range to prevent damage to the dewatering system 100. The pressure reducing regulator 118 is preferably the Fisher Model 627MR-484.

Dewatering system 100 further includes a drip pipe 122 having a small diameter for redirecting water within the water intake pipe 112 and the water dispensing pipe 114 to the interior of the subsurface vault 200 to prevent freezing of the water within pipes 112, 114.

Figure 2:
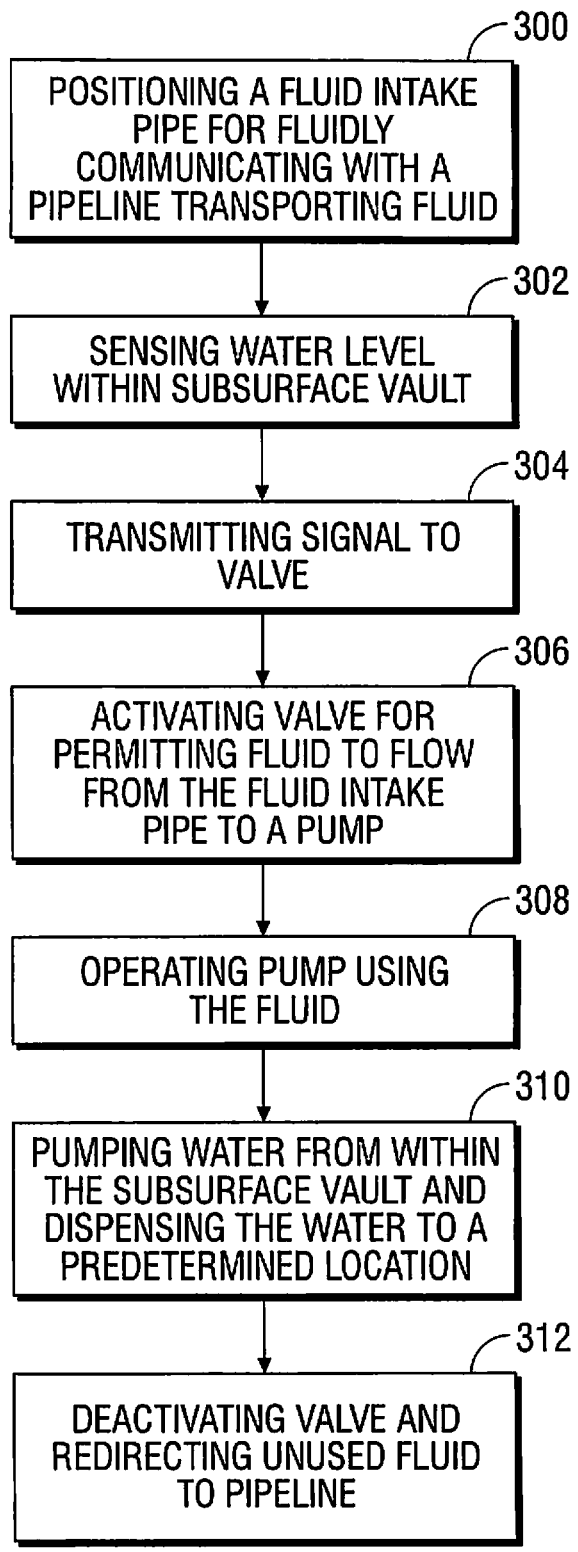
FIG. 2 is flow chart illustrating a method for dewatering a subsurface vault in accordance with the present disclosure.

With reference to FIG. 2, a method for dewatering a subsurface vault 200 housing a portion of a pipeline 202 transporting fluid will now be discussed. The method includes step 300 wherein a fluid intake pipe 102 is positioned for fluidly communicating with a pipeline 202 transporting fluid. A liquid level sensor 116 senses the water level of stagnant water within the subsurface vault 200 (Step 302). If the stagnant water level exceeds a predetermined level, the liquid level sensor 116 generates and transmits an activation signal to valve 108 (Step 304). Upon receiving the activation signal, valve 108 is activated for permitting a fluid flow from the fluid intake pipe 102 to fluid pump system 104 (Step 306).

When fluid pump system 104 receives the fluid, a pump 110 of the fluid pump system is activated for pumping the stagnant water to a predetermined dispensing location via a water dispensing pipe 114 (Step 308). The pump 110 is operated using the fluid redirected from the pipeline 202. During operation of the pump 110, the stagnant water is drawn into the pump 110 via water intake pipe 112 (Step 310).

When the stagnant water drops to a desired level, the liquid level sensor 116 generates and transmits a deactivation signal to the valve 108 for deactivating the valve 108. When the valve 108 is deactivated, fluid flow from the fluid intake pipe 102 to the fluid pump system 104 is discontinued, thus deactivating pump 110.

After deactivation of the pump 110, any fluid which is not used to operate the pump 110 and other components, such as the valve 108, is returned to the pipeline 202 via fluid outlet pipe 106. (Step 312) Any residual water remaining in the water dispensing pipe 114 is redirected to the water intake pipe 112 via drip pipe 122. The drip pipe 122 allows the non-dispensed water to return to the interior of the subsurface vault 200 to prevent freezing of the water within pipes 112, 114.

It will be understood that various modifications and changes in form and detail may be made to the embodiments of the present disclosure without departing from the spirit and scope of the embodiments described herein. Therefore, the above description should not be construed as limiting the present disclosure but merely as exemplifications of preferred embodiments thereof. Those skilled in the art will envision other modifications within the scope and spirit of the present disclosure as defined by the claims appended hereto.

What is claimed is:

1. A dewatering system for a subsurface vault housing a portion of a pipeline, said dewatering system comprising:
a fluid inlet pipe adapted for fluidly communicating with the pipeline and redirecting fluid being transported by said pipeline;
a fluid pump system in fluid communication with said fluid inlet pipe for receiving the redirected fluid, said fluid pump system comprising a fluid-operated pump being operated by said redirected fluid for drawing water within the subsurface vault via an intake pipe and pumping the water through a dispensing pipe; and
a fluid outlet pipe in fluid communication with the fluid pump system and the pipeline for redirecting fluid not used to operate the pump to the pipeline.

2. The dewatering system according to claim 1, further comprising a valve operably connected to the fluid inlet pipe for controlling fluid flow to said fluid pump system.

3. The dewatering system according to claim 2, further comprising a liquid level sensor operably connected to the valve, wherein the liquid level sensor transmits a signal to the valve when the water within the subsurface vault reaches a predetermined level and wherein the valve is actuated by said signal for permitting fluid flow to said fluid pump system.

4. The dewatering system according to claim 3, wherein the liquid level sensor is powered by solar energy.

5. The dewatering system according to claim 2, wherein the valve is selected from the group consisting of fluid-operated ball, gate, check, baumann, sliding stem and butterfly valves.

6. The dewatering system according to claim 1, further comprising a pressure reducing regulator operably connected to the fluid inlet pipe for reducing pressure of fluid within the fluid inlet pipe.

7. The dewatering system according to claim 1, further comprising a drip pipe operably connected to the dispensing pipe for redirecting water within the dispensing pipe to the intake pipe.

8. The dewatering system according to claim 1, wherein the pump is selected from the group consisting of fluid-operated pneumatic, diaphragm, rotary, reciprocating and positive displacement pumps.

9. The dewatering system according to claim 1, wherein the fluid is one of a gas and a liquid.

10. A method for dewatering a subsurface vault housing a portion of a pipeline, the method comprising:
fluidly communicating fluid being transported by the pipeline to a fluid intake pipe;
delivering the fluid within the fluid intake pipe to a pump;
operating the pump using the fluid delivered by the fluid intake pipe for drawing water from within the subsurface vault via an intake pipe and pumping the water to a dispensing pipe for dispensing the water from within the subsurface vault to a predetermined location; and
redirecting fluid not used to operate the pump to the pipeline.

11. The method according to claim 10, further comprising controlling a valve for controlling the delivery of the fluid to the pump.

12. The method according to claim 11, wherein the step of controlling the valve includes sensing a water level within the subsurface vault and transmitting an activation signal to the valve when the water level exceeds a predetermined level to activate the valve to deliver the fluid to the pump.

13. The method according to claim 12, further comprising the step of transmitting a deactivation signal to the valve after a predetermined time period to deactivate the valve and prevent fluid from being delivered to the pump.

14. The method according to claim 13, further comprising returning water in the dispensing pipe to the intake pipe after deactivation of the valve.

15. The method according to claim 11, wherein the valve is selected from the group consisting of fluid-operated ball, gate, check, baumann, sliding stem and butterfly valves.

16. The method according to claim 10, wherein the pump is selected from the group consisting of fluid-operated pneumatic, diaphragm, rotary, reciprocating and positive displacement pumps.

17. The method according to claim 10, further comprising the step of regulating the pressure of the fluid within the fluid intake pipe.

18. A method for removing water accumulation from a subsurface vault, the method comprising:

providing a dewatering system comprising a gas inlet pipe connected to a pipeline transporting gas therein; a valve in fluid communication with the fluid inlet pipe; a pump in fluid communication with the valve; and a gas outlet pipe operably connected to the pump at a first location and to the pipeline at a second location; and activating the valve for permitting gas to flow from the pipeline to the pump; and operating the pump using the gas for drawing water from within the vault and pumping the water to a predetermined location outside the subsurface vault.

19. The method according to claim 18, wherein the step of activating the valve comprises sensing the water level within the subsurface vault and transmitting a signal to the valve when the water level exceeds a predetermined level.

20. The method according to claim 18, further comprising redirecting gas not used to operate the system to the pipeline for being transported downstream from the dewatering system.

* * * * *